(12) United States Patent
Lo

(10) Patent No.: US 8,533,764 B2
(45) Date of Patent: Sep. 10, 2013

(54) SYSTEM AND METHOD FOR REGULATING BANDWIDTH IN A MULTICAST VIDEO TRANSMISSION SYSTEM

(76) Inventor: Lawrence Lo, Issaquah, WA (US)

( * ) Notice: Subject to any disclaimer, the term of this patent is extended or adjusted under 35 U.S.C. 154(b) by 942 days.

(21) Appl. No.: 12/254,811

(22) Filed: Oct. 20, 2008

(65) Prior Publication Data

US 2009/0241148 A1    Sep. 24, 2009

Related U.S. Application Data

(60) Provisional application No. 60/960,913, filed on Oct. 19, 2007.

(51) Int. Cl.
*H04N 7/18* (2006.01)
*H04N 7/173* (2011.01)
*H04N 7/16* (2011.01)
*G06F 15/16* (2006.01)

(52) U.S. Cl.
USPC ............... 725/81; 725/74; 725/133; 725/141; 725/153; 709/232; 709/233; 709/234; 709/235

(58) Field of Classification Search
USPC ...... 725/74, 81, 133, 141, 153; 709/232–235
See application file for complete search history.

(56) References Cited

U.S. PATENT DOCUMENTS

| | | | |
|---|---|---|---|
| 4,771,283 A | 9/1988 | Imoto | |
| 5,243,415 A | 9/1993 | Vance | |
| 5,670,958 A | 9/1997 | Hauser et al. | |
| 6,125,365 A | 9/2000 | Nakatsugawa | |
| 6,211,926 B1 | 4/2001 | Won | |
| 6,972,661 B2 | 12/2005 | Wang | |
| 7,392,301 B1 | 6/2008 | Perry et al. | |
| 2003/0117956 A1* | 6/2003 | Lee ................................. | 370/232 |
| 2004/0068744 A1 | 4/2004 | Claussen et al. | |
| 2004/0187164 A1 | 9/2004 | Kandasamy et al. | |
| 2005/0060760 A1 | 3/2005 | Jaffe et al. | |
| 2005/0105498 A1 | 5/2005 | Hardacker et al. | |
| 2005/0135304 A1 | 6/2005 | Wentink et al. | |
| 2006/0095472 A1 | 5/2006 | Krikorian et al. | |
| 2006/0110067 A1 | 5/2006 | Kahan | |
| 2006/0117367 A1 | 6/2006 | Lyle | |

(Continued)

OTHER PUBLICATIONS

RFC1889: RTP: A Transport Protocol for Real-Time Applications, Jan. 1996.

(Continued)

*Primary Examiner* — Chris Parry
*Assistant Examiner* — Gigi L Dubasky
(74) *Attorney, Agent, or Firm* — Davidson Berquist Jackson & Gowdey, LLP

(57) ABSTRACT

A video transmitter can adaptively alter its transmission rate to plural receivers which receive video via multicast transmission. While the transmitter is initially in the "no tuning state", the need for a video tune-up state change can be determined. If so, then the state can be set to "tuning up" and the retransmission rate can be increased. However, if "tuning-up" is no longer required, the state returns to the "no tuning state" Likewise, the need for a video tune down slate change can be determined and the retransmission rate can be decreased. However, if the state is set to "tuning down" and "tuning down" is no longer required, the state is set such that "tuning down" is no longer true and the state returns to the "no tuning" state.

6 Claims, 7 Drawing Sheets

(56) References Cited

U.S. PATENT DOCUMENTS

| | | |
|---|---|---|
| 2006/0123053 A1 | 6/2006 | Scannell |
| 2006/0143335 A1 | 6/2006 | Ramamoorthy et al. |
| 2006/0209745 A1 | 9/2006 | MacMullan et al. |
| 2006/0271954 A1 | 11/2006 | Lankford et al. |
| 2007/0165997 A1 | 7/2007 | Suzuki et al. |
| 2008/0270528 A1* | 10/2008 | Girardeau et al. ............ 709/203 |

OTHER PUBLICATIONS

U.S. Appl. No. 11/931,301, filed Jan. 4, 2011, PTO Office Action.
U.S. Appl. No. 11/931,349, filed Jan. 4, 2011, PTO Office Action.
U.S. Appl. No. 11/931,417, filed Jan. 4, 2011, PTO Office Action.
U.S. Appl. No. 11/931,454, filed Jan. 4, 2011, PTO Office Action.
U.S. Appl. No. 11/931,301, filed Jun. 23, 2010, PTO Office Action.
U.S. Appl. No. 11/931,417, filed Jun. 23, 2010, PTO Office Action.
U.S. Appl. No. 12/254,124, filed Feb. 18, 2011, PTO Office Action.
U.S. Appl. No. 11/931,301, filed Sep. 27, 2012, PTO Office Action.
U.S. Appl. No. 12/254,124, filed Nov. 1, 2011, PTO Office Action.
"RTP extension for Scalable Reliable Multicast", by Peter Parnes, Internet Engineering Task Force, Internet-Draft, "draft-parnes-rtp-ext-srm-00.txt," dated Nov. 16, 1996.
Emerge MPX1500 HD Multipoint Extender: Installer/User Guide (590-906-501A), 2008.
International Search Report and Written Opinion mailed Feb. 26, 2008 in appln. No. PCT/US2007/019542.
U.S. Appl. No. 11/896,970, filed Jun. 23, 2010, PTO Office Action.
U.S. Appl. No. 11/931,349, filed Jul. 9, 2010, PTO Office Action.
U.S. Appl. No. 11/931,454, filed Jul. 9, 2010, PTO Office Action.

\* cited by examiner 260   130

SYSTEM AND METHOD FOR REGULATING BANDWIDTH IN A MULTICAST VIDEO TRANSMISSION SYSTEM

CROSS REFERENCE TO RELATED APPLICATIONS

The present application is related to and claims priority to U.S. Provisional Patent Application 60/960,913, filed Oct. 19, 2007, the contents of which are incorporated herein by reference. The present application is further related to U.S. Non-Provisional and Provisional patent application Ser. Nos. 11/896,970 and 60/842,706, filed Sep. 7, 2007 and Sep. 7, 2006, respectively. The contents of those applications are also incorporated herein by reference.

FIELD OF INVENTION

The present invention is directed to a system and method for communicating between a transmitter and its corresponding group of receivers in a multicast communications system. In one such configuration, a set of quality of service thresholds are configurable in a transmitter and its receivers to compensate for retransmission overhead and congestion caused by retransmission.

DISCUSSION OF THE BACKGROUND

Keyboard, video and mouse (KVM) switches are known and used in a number of scenarios where a single keyboard and mouse is to control a number of remote computers. Thus, many transmitters (i.e., the remote computers) are connected to a single workstation including a keyboard, a monitor and a mouse. However, a consumer may also wish to operate in a reverse configuration where a single original video and/or audio source is used to control multiple video displays/monitors. Systems where a single video source can control multiple displays include the EMERGE MPX1500 HD MULTI-POINT EXTENDER manufactured and sold by AVOCENT CORPORATION, the assignee of the present application.

When using such a multi-display system, a transmitter (at an originating end) receives audio and/or video from an audio/video source (e.g., a cable/satellite set-top box, a computer, a DVD player (either original definition or high definition), a game console, a CD player or any other electronics device) (in either regular or high definition mode) and converts the audio and/or video signal (hereinafter AV signal) to a digitized, packetized form. (In configurations in which a transmitter receives video already in digital form, the transmitter need not digitize the video but only packetize it.) The transmitter then forwards (e.g., using at least one packet-switched network) the converted AV signal on to plural receivers which convert the digital AV signal back to its native form.

As transmission errors occur in such a configuration, retransmission of missing or corrupted information is required in order to keep the displays of the receivers in synchronization with the transmitter. However, it is possible to do more harm than good with a retransmission protocol.

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

Figure 1:
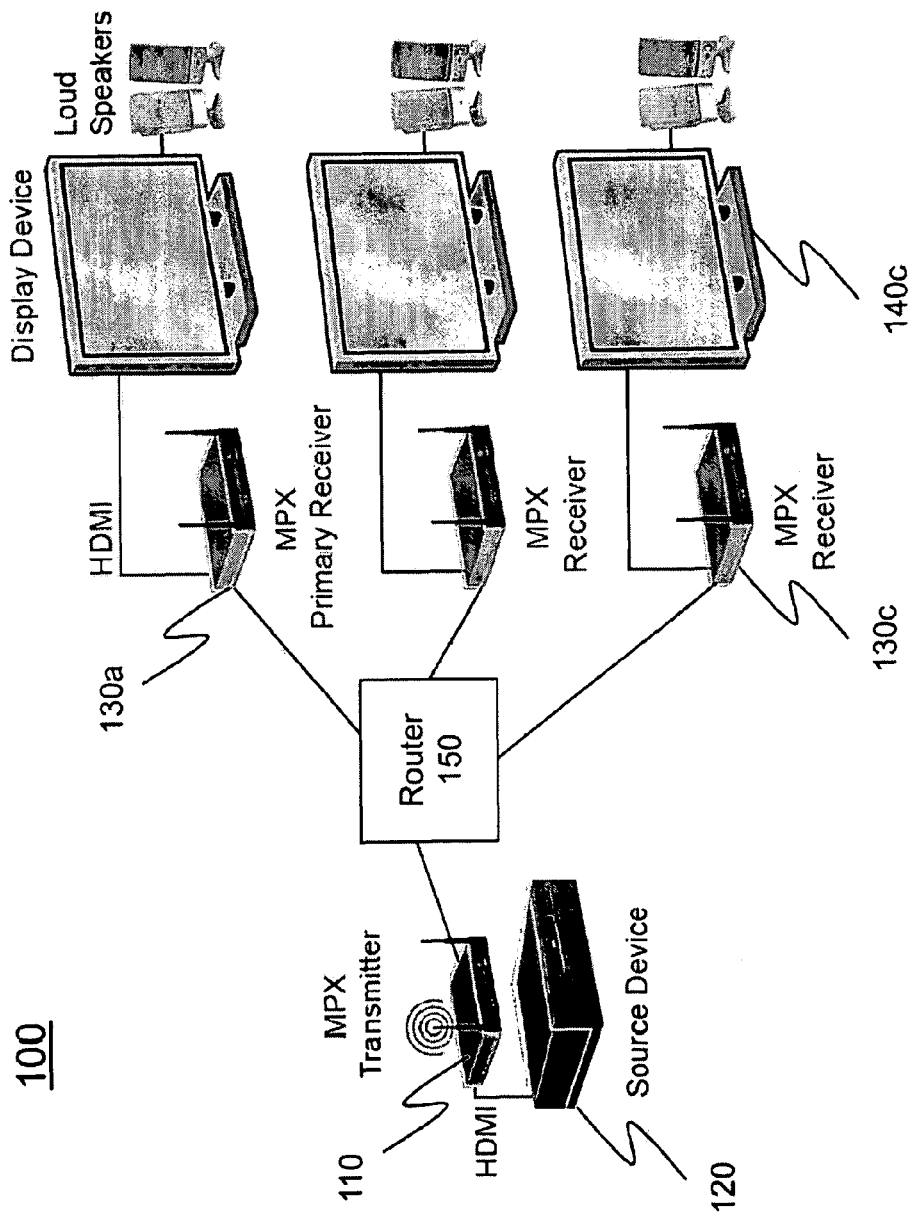
FIG. 1 is block diagram of a series of receivers communicating with a corresponding transmitter in order to display substantially the same image on each of the televisions connected to a receiver.
Figure 3:
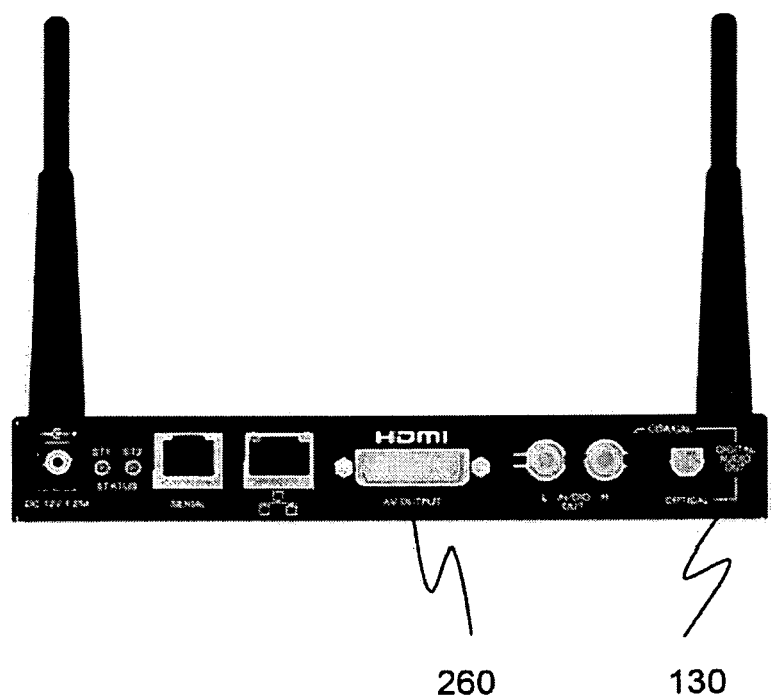
FIG. 3 is an illustration of an exemplary receiver (e.g., for use in the system of FIG. 1)

Turning to FIG. 1, a multi-display system 100 includes a transmitter 110 (at an originating end) that receives audio and/or video from an audio/video source 120 (e.g., a cable/satellite set-top box, a computer, a DVD player (either original definition or high definition), a game console, a CD player or any other electronics device) and converts the audio and/or video signal (hereinafter AV signal) to a digitized, packetized form. (In configurations in which a transmitter receives video already in digital form, the transmitter need not digitize the video but only packetize it.) The transmitter 110 then forwards (e.g., using at least one wireless packet-switched network) the converted AV signal on to plural receivers 130a-130c which convert the digital AV signals back to their native form and output them to display devices connected to AV connectors (260 of FIG. 3) via AV cables. As would be appreciated by those of ordinary skill in the art, the number of receivers 130 may be other than as illustrated, and in one embodiment includes up to 8 or up to 16 different receivers per transmitter.

Figure 2:
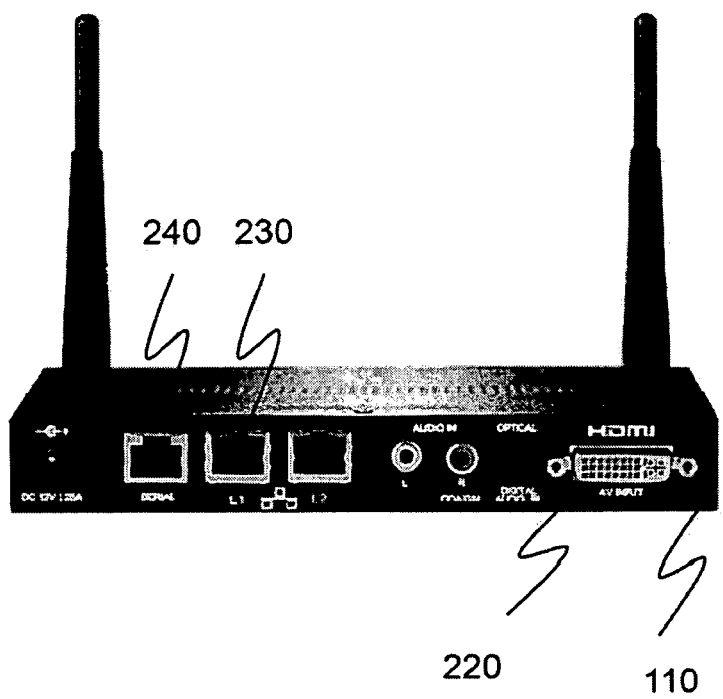
FIG. 2 is an illustration of an exemplary transmitter (e.g., for use in the system of FIG. 1)

As shown in FIG. 2, a transmitter 110 may include one or more antennae for at least one wireless digital AV communications interface (e.g., (1) an 802.11x interface where "x" represents any of the family of protocols, such as "a", "b", "g" and "n", or (2) a WiMax-based interface) over which the digitized AV signal (received over the AV interface 220, such as a universal interface supporting HDMI, VGA and/or RGB) is sent from the transmitter to the receivers. The at least one wireless digital AV communications interface may also exchange other information with the receivers 130 as described in greater detail below. The illustrated transmitter 110 further includes at least one configuration port (e.g., illustrated as a serial port 240 and an Ethernet port 230) which can be used to configure the transmitter with configuration information (e.g., retransmission thresholds). For example, a configuring computer may be coupled to the Ethernet port 230 (using a regular or cross-over Ethernet cable), thereby providing a direct connection between the transmitter and the configuring computer. A configuration tool (e.g., a web browser) on the configuring computer can then be used to receive configuration information and/or menus and/or forms from the transmitter 110 and to transmit updates to the configuration information to the transmitter 110. Any number of data transfer protocols (e.g., HTTP, FTP, gopher or WebDAV) can be used to carry information over any number of communications protocols (e.g., TCP/IP, RDP/IP, UDP/IP, multicast, NetBIOS). Also, rather than a direct connection, a wired or wireless connection to a known IP address, when known, of the transmitter may be used to configure the transmitter 110 and/or the receiver 130 (which can be communicated with through the transmitter 110).

In one embodiment, the transmitter 110 is configured via a web browser to set communications thresholds that can help to control the operation of the transmitter 110 and/or the receivers 130. Exemplary thresholds that can be set via the web browser include, but are not limited to, retry limits for the transmitter and receivers. Each of these thresholds is measured as a function given by:

$$\frac{\text{Audio/video generated retry bitrate}}{\text{Audio/video transmitted source bitrate}} \times 100\%$$

Using this formula, one specifies a retry limit for a receiver and a transmitter as percentages. The retry limit for a: receiver ($RL_R$) (also referred to as a receiver retry limit) represents the maximum bitrate of retransmission data that can be requested by a receiver. For example, if the receiver estimates that the audio/video transmitted source bitrate (AVTSB) is 15 Mbps and the $RL_R$ is 10%, then the receiver can only request retransmission data at a rate up to 15 Mbps*10%=1.5 Mbps. However, before retransmission is requested, the receiver should detect that it is missing a sufficient amount and/or for a sufficient time to warrant the retransmission of data. This threshold value is called the "Audio/Video Missing Bitrate" (AVMB). If the AVMB is 500 kbps, it means that the corresponding receiver should detect that it is missing 500 kbps of source audio/video data before it begins requesting retransmission of missing audio/video data. Once it has detected that it is missing source data at least the AVMB, a receiver can then begin requesting missing source audio/video data up to the retry limit $RL_R$. The $RL_R$ may be increased in order to increase the amount of source audio/video data that is retransmitted (thereby improving the quality of the picture). However, if a network starts to become overloaded, the $RL_R$ may be decreased to reduce congestion caused by retransmissions.

Similarly, the retry limit for a transmitter ($RL_T$) (also referred to as a transmitter retry limit) represents the maximum bitrate of retransmission data that can be sent by a transmitter. For example, if the AVTSB is 15 Mbps and the $RL_T$ is 30%, then the transceiver can only send retransmission data at a rate up to 15 Mbps*30%=4.5 Mbps. The $RL_T$ may be increased in order to increase the amount of source audio/video data that is retransmitted (thereby improving the quality of the picture at receivers with poor reception). However, if a network starts to become overloaded, the $RL_T$ may be decreased to reduce congestion caused by retransmissions. When a transmitter retransmits audio/video data, it is retransmitted using a multicast transmission (as was the original audio/video data transmission).

Figure 4:
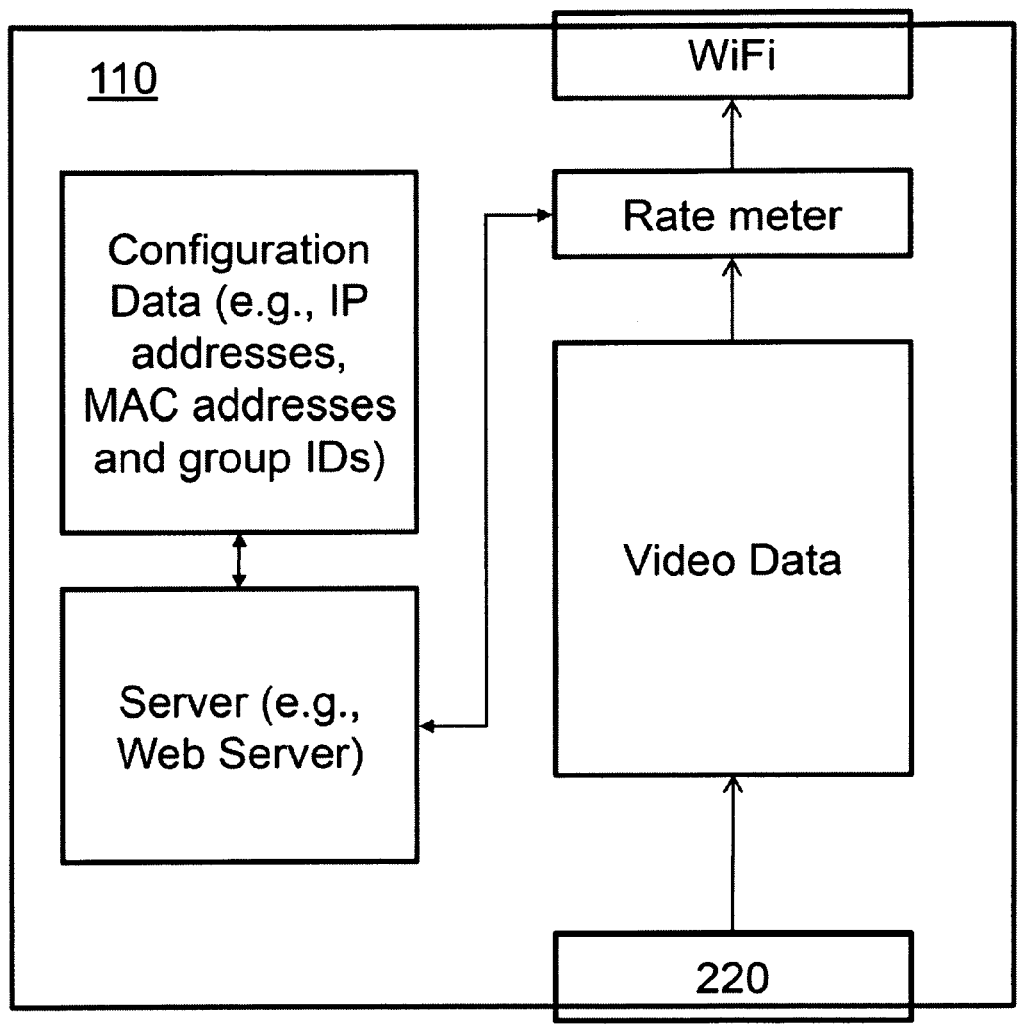
FIG. 4 is a block diagram of a portion of the internals of an exemplary transmitter as shown in FIG. 2.
Figure 6:
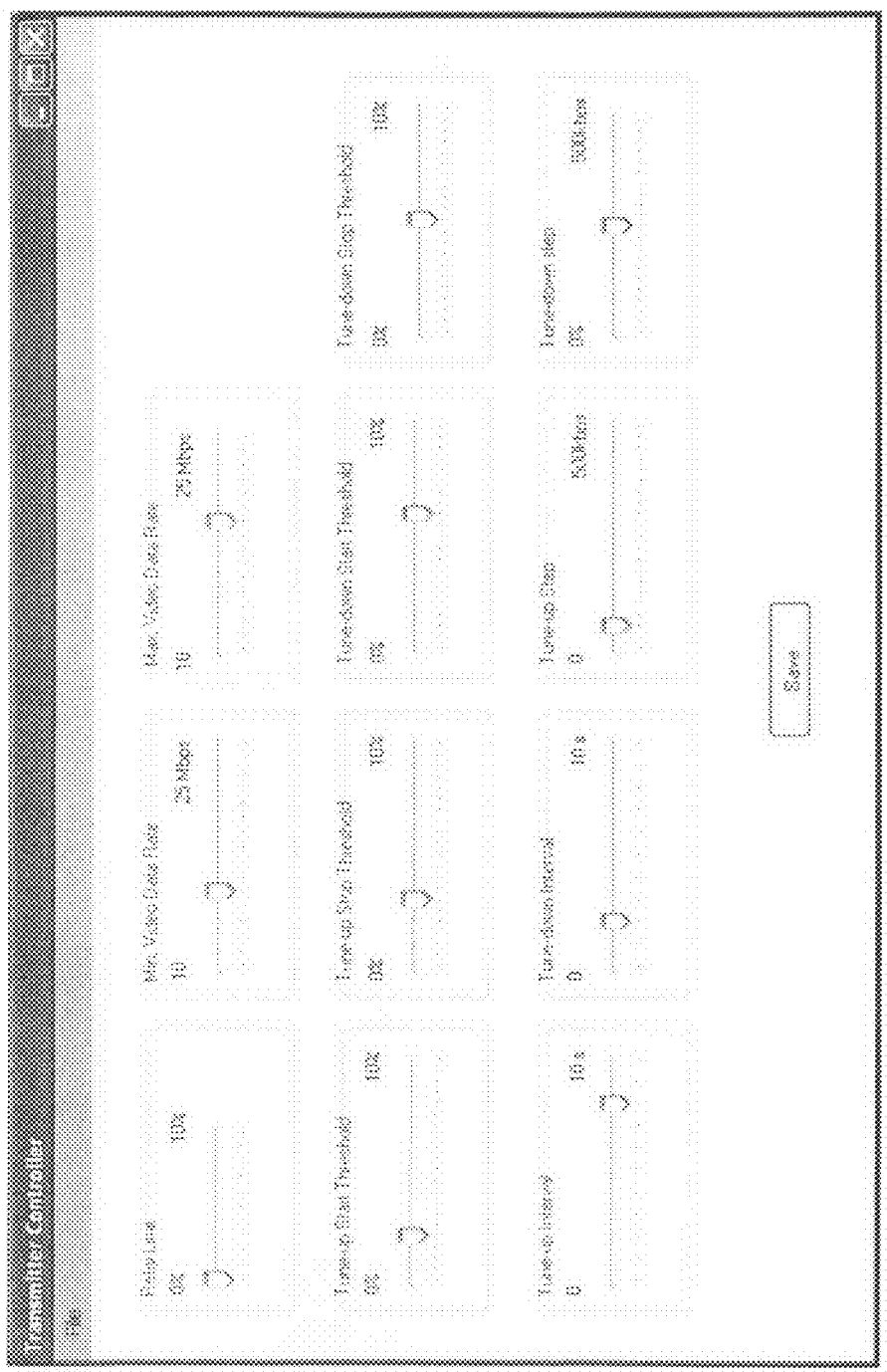
FIG. 6 is a screen capture of an exemplary interface for updating configuration parameters for a transmitter (e.g., a transmitter of FIG. 1.

In addition to the retry limit thresholds ($RL_R$ and $RL_T$), other thresholds can also be specified for the transmitter and individual receivers. (All receivers need not be set with the same values and likely will not be in order to address different environmental conditions (e.g., due to wireless reception issues). In one configuration of an exemplary transmitter, the transmitter further includes additional configurable parameters such as: (1) video data rate minimum (or minimum video data rate), (2) video data rate maximum (or maximum video data rate), (3) video tune-up start threshold, (4) video tune-up stop threshold, (5) video tune-down start threshold, (6) video tune-down stop threshold), (7) video tune-up interval, (8) video tune-down interval, (9) video tune-up step and (10) video tune-down step. Uses of each of these parameters are described in greater detail below and may be set with a remote interface (e.g., a web-based interface or a programmatic interface such as shown in FIG. 6) for contacting an internal server (e.g., a web server) of the transmitter (e.g., as shown in FIG. 4).

A video data rate minimum (or minimum video data rate) specifies the minimum acceptable video quality setting. The adaptive video quality setting is guaranteed to be greater than or equal to this value. For example, if this parameter is set to 15 Mbps, the adaptive video quality setting will always be >=15 Mbps. Initially one can set this parameter to be somewhat less than the desirable video quality setting. For example, if the desirable quality is 20 Mbps, one can set it to 18 Mbps. If the video quality at this minimum setting is unacceptable (e.g. too grainy), one can raise this setting. While it will improve video quality per frame, it may result in a lower Frame Rate. If the Frame Rate is sub-optimal at this minimum setting, one can lower this setting. While it may increase Frame Rate, it will lower video quality per frame. One can set this parameter to be equal to Video Data Rate Maximum to effectively fix the video quality setting.

A video data rate maximum (or maximum video data rate) specifies the maximum desirable video quality setting. The adaptive video quality setting is guaranteed to be less than or equal to this value. For example, if this parameter is set to 1.9 Mbps, the adaptive video quality setting will always be <=19 Mbps. Initially one can set this parameter to be the desired video quality setting, e.g. 20 Mbps. The adaptive algorithm will try to increase the video quality setting towards this maximum setting. It may cause periodic bursts of frame drops as it passes the maximum supported video quality. For example, if this parameter is set to 20 Mbps but the available bandwidth can only support a maximum video quality of 19 Mbps, a short burst of frame drops may result when the video quality setting passes 19 Mbps. Instantly, the algorithm will lower the video quality setting and the cycle repeats. One can lower this setting if one sees periodic bursts of frame drops. One can set this parameter to be equal to Video Data Rate Minimum to effectively fix the video quality setting.

A video tune-up start threshold specifies the threshold of generated retransmission data less than which to start tuning up the adaptive video quality setting. This threshold is expressed as a ratio of Audio/Video Generated Retry Bitrate to Audio/Video Transmitted Source Bitrate. For example, if the Audio/Video Transmitter Source Bitrate is 15 Mbps and this threshold is set to 2%, the algorithm will start tuning up the video quality setting when the Audio/Video Generated Retry Bitrate is less than 15 Mbps×2%=300 kbps. This threshold can be increased to make it more probable for the algorithm to start tuning up the video quality setting.

A video tune-up stop threshold specifies the threshold of generated retransmission data greater than which to stop tuning up the adaptive video quality setting. This threshold is expressed as a ratio of Audio/Video Generated Retry Bitrate to Audio/Video Transmitted Source Bitrate. For example, if the Audio/Video Transmitter Source Bitrate is 15 Mbps and this threshold is set to 3%, the algorithm will stop tuning up the video quality setting when the Audio/Video Generated Retry Bitrate is greater than 15 Mbps×3%=450 kbps. This threshold can be increased to make it less probable for the algorithm to stop tuning up the video quality setting.

A video tune-down start threshold specifies the threshold of generated retransmission data greater than which to start tuning down the adaptive video quality setting. This threshold is expressed as a ratio of Audio/Video Generated Retry Bitrate to Audio/Video Transmitted Source Bitrate. For example, if the Audio/Video Transmitter Source Bitrate is 15 Mbps and this threshold is set to 6%, the algorithm will start tuning down the video quality setting when the Audio/Video Generated Retry Bitrate is greater than 15 Mbps×6%=900 kbps. Decrease this threshold to make it more probable for the algorithm to start tuning down the video quality setting.

A video tune-down stop threshold specifies the threshold of generated retransmission data less than which to stop tuning down the adaptive video quality setting. This threshold is expressed as a ratio of Audio/Video Generated Retry Bitrate to Audio/Video Transmitted Source Bitrate. For example, if the Audio/Video Transmitter Source Bitrate is 15 Mbps and this threshold is set to 5%, the algorithm will stop tuning down the video quality setting when the Audio/Video Generated Retry Bitrate is less than 15 Mbps×5%=750 kbps. Decrease this threshold to make it less probable for the algorithm to stop tuning down the video quality setting.

A video tune-up interval specifies the minimum interval to wait for before tuning up the video quality setting by a step. If this parameter is set to 8 seconds, the algorithm will wait for at least 8 seconds before tuning up the video quality setting. The conditions for tuning up the video quality must hold during that interval, or the timer will be reset. Decrease this interval to make it more probable and more responsive for the algorithm to tune up the video quality setting. It may result in a higher video quality setting. However, a higher value than Video Tune-down Interval is recommended.

A video tune-down interval specifies the minimum interval to wait for before tuning down the video quality setting by a step. If this parameter is set to 2 seconds, the algorithm will wait for at least 2 seconds before tuning down the video quality setting. The conditions for tuning down the video quality must hold during that interval, or the timer will be reset. Increase this interval to make it less probable and less responsive for the algorithm to tune down the video quality setting. It may result in a higher video quality setting. However, a lower value than Video Tune-up Interval is recommended.

A video tune-up step specifies the adjustment step when tuning up the video quality setting. If this parameter is set to 50 kbps, the algorithm will tune up the video quality setting by 50 kbps in each step. Increase this parameter to make it faster for the algorithm to tune up the video quality setting. However, a lower value than Video Tune-down Step is recommended.

A video tune-down step specifies the adjustment step when tuning down the video quality setting. If this parameter is set to 500 kbps, the algorithm will tune down the video quality setting by 500 kbps in each step. Decrease this parameter to make it slower for the algorithm to tune down the video quality-setting. However, a higher value than Video Tune-up Step is recommended.

In addition to setting parameters in a transmitter, a user may wish to monitor the status or current parameters of the transmitter to determine how well it is operating and if changes may be needed. A transmitter may have its settings queried or updated using a generic interface (e.g., a web-based interface) or a custom-built interface using at least one wired or wireless communication interface in the transmitter. As shown in FIG. 4, a web server (or other server) internal to the transmitter provides access for querying and setting parameters in the transmitter. Furthermore, to the extent that the transmitter gathers status updates from receivers or can request status parameters from receivers, the transmitter can provide that information to the interface for display as well.

Exemplary parameters that can be queried from the transmitter include, but are not limited to: Audio/Video Transmitted Total Bitrate, Audio/Video Transmitted Source Bitrate, Audio/Video Transmitted Retry Bitrate, Audio/Video Generated Retry Bitrate and/or Current Video Data Rate.

Audio/Video Transmitted Total Bitrate represents the bitrate of total audio and video data transmitted by a transmitter. It includes both source and retransmission data. For example, if this bitrate is 21 Mbps, it means this transmitter is sending 21 Mbps of data in total.

Audio/Video Transmitted Source Bitrate represents the bitrate of audio and video source data transmitted by a transmitter. For example, if this bitrate is 19 Mbps, it means this transmitter is sending 19 Mbps of source data.

Audio/Video Transmitted Retry Bitrate represents the bitrate of audio and video retransmission data transmitted by a transmitter. For example, if this bitrate is 500 kbps, it means this transmitter is sending 500 kbps of retransmission data to all receivers in the A/V extension network. This indicates how much retransmission data are actually sent after the Transmitter Retry Limit is imposed.

Audio/Video Generated Retry Bitrate represents the bitrate of audio and video retransmission data generated by a transmitter as a result of requests from all receivers in the A/V extension network. Since a transmitter suppresses duplicated retransmission to multiple receivers, this bitrate may be less than the sum of Audio/Video Retry Bitrate of all receivers in the A/V extension network. For example, if this bitrate is 800 kbps, it means this transmitter is generating 800 kbps of retransmission data. This indicates how much retransmission data are to be sent before the Transmitter Retry Limit is imposed.

Current Video Data Rate represents the current adaptive video quality setting controlled by the algorithm. It is guaranteed to fall between the configuration parameters Video Data Rate Minimum and Video Data Rate Maximum. This video quality setting controls the JPEG2000 compression level. It suggests the target video data rate of the compressed video stream. However the actual video bitrate, namely the Video Transmitted Source Bitrate, depends on the frame content and can be less than this setting. For example, if the Video Data Rate Minimum and Video Data Rate Maximum are 15 Mbps and 20 Mbps respectively, and the Current Video Data Rate is 18 Mbps, it indicates that the algorithm has adjusted the video quality setting to be 18 Mbps, which is between 15 Mbps and 20 Mbps. However the Video Transmitted Source Bitrate can be 5 Mbps if the current frame is a simple image that can be readily compressed.

Figure 5:
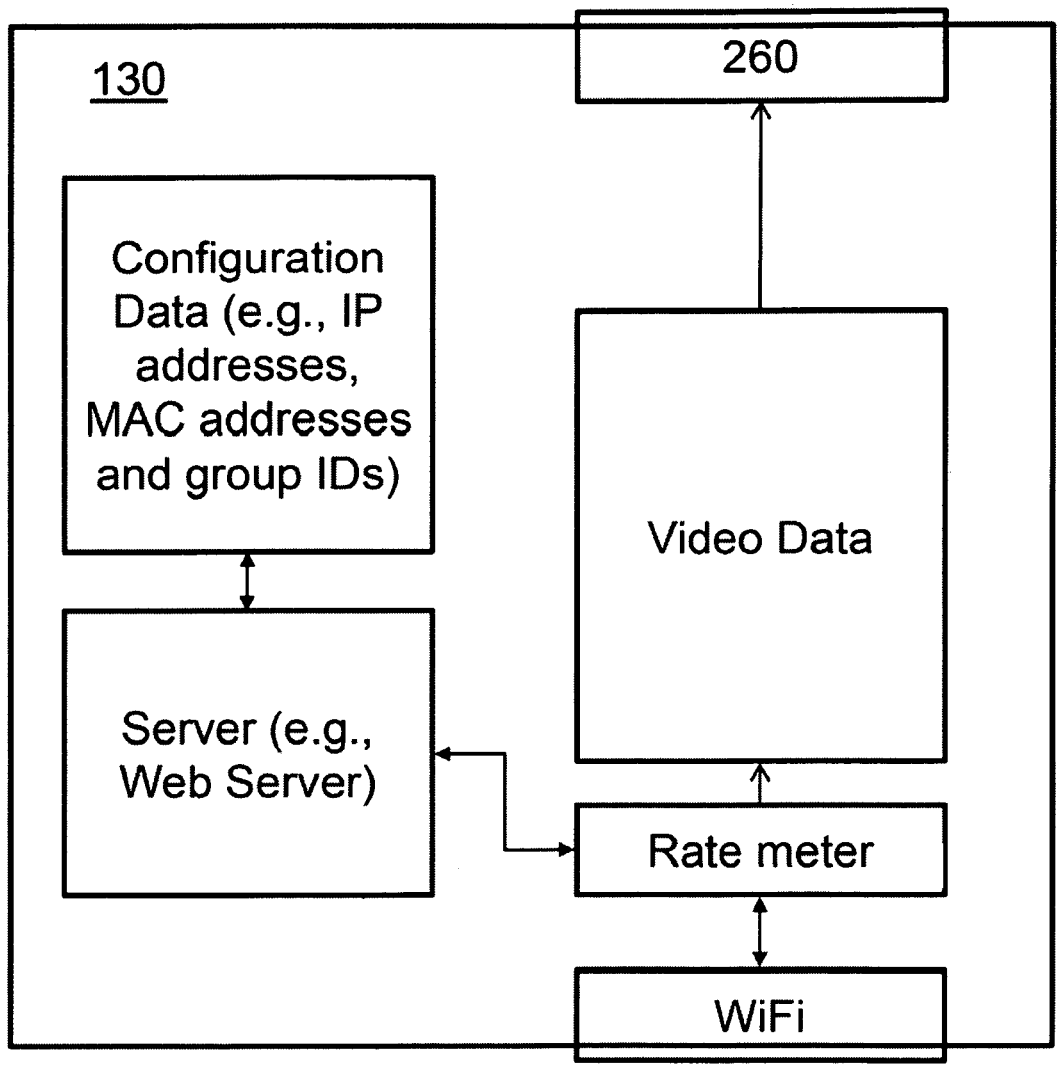
FIG. 5 is a block diagram of a portion of the internals of an exemplary receiver as shown in FIG. 3.

In yet another embodiment, each receiver, like the transmitter, may have its settings queried or updated using a generic interface (e.g., a web-based interface) or a custom-built interface using at least one wired or wireless communication interface in the receiver. As shown in FIG. 5, a web server (or other server) internal to the receiver provides access for querying and setting parameters in the receiver. Exemplary status parameters that can be queried from the receiver include, but are not limited to: Audio/Video Received Bitrate, Audio/Video Missing Bitrate, Audio/Video Retry Bitrate, Audio/Video Recovered Bitrate and/or Audio/Video Lost Bitrate.

Audio/Video Received Bitrate represents the bitrate of total audio and video data received by a receiver. It includes both source and retransmission data. If this bitrate is considerably less than the Audio/Video Transmitted Source Bitrate (at the transmitter), there may be a bandwidth issue with this receiver. For example, if this bitrate is 10 Mbps while the Audio/Video Transmitted Source Bitrate is 15 Mbps, it means this receiver cannot receiver all the source data sent by the transmitter. Increasing retransmission limit would not help in this case. One should check the location of the receiver.

Audio/Video Missing Bitrate represents the bitrate of missing audio and video data before retransmission at a receiver. For example, if this bitrate is 500 kbps, it means this receiver is missing 500 kbps of source data before retransmission is requested for those missing packets. This indicates how much retransmission data are to be requested by this receiver before the Receiver Retry Limit is imposed.

Audio/Video Retry Bitrate represents the bitrate of retransmission audio and video data requested by a receiver. For example, if this bitrate is 300 kbps, it means this receiver is requesting 300 kbps of source data to be retransmitted by the transmitter. This indicates how much retransmission data are actually requested by this receiver after the Receiver Retry Limit is imposed.

Audio/Video Recovered Bitrate represents the bitrate of recovered audio and video data by retransmission at a receiver. For example, if this bitrate is 400 kbps, it means this receiver successfully recovers 400 kbps of missing packets by retransmission. Note that this bitrate can be greater than the Audio/Video Retry Bitrate since a receiver can receive retransmission data requested by other receivers in the A/V extension network.

Audio/Video Lost Bitrate represents the bitrate of permanently lost audio and video data at a receiver. For example, if the Audio/Video Missing Bitrate is 500 kbps and the Audio/Video Recovered Bitrate is 400 kbps, this bitrate is equal to 500 kbps−400 kbps=100 kbps.

Based on the thresholds that have been set in the transmitter, the transmitter can adaptively update its bitrates using the steps and intervals described herein. For example, the transmitter may analyze the current transmission and retransmission rates (using an internal rate meter which is part of the communications system of the transmitter) to determine if video bitrates need to begin being stepped up or down, continue being stepped up or down, or stop being stepped up or down. If so, the transmitter may need to change state to go from its old state (e.g., transmission at one rate) to its new state (transmission at a new rate and stepping up or down).

Figure 7:
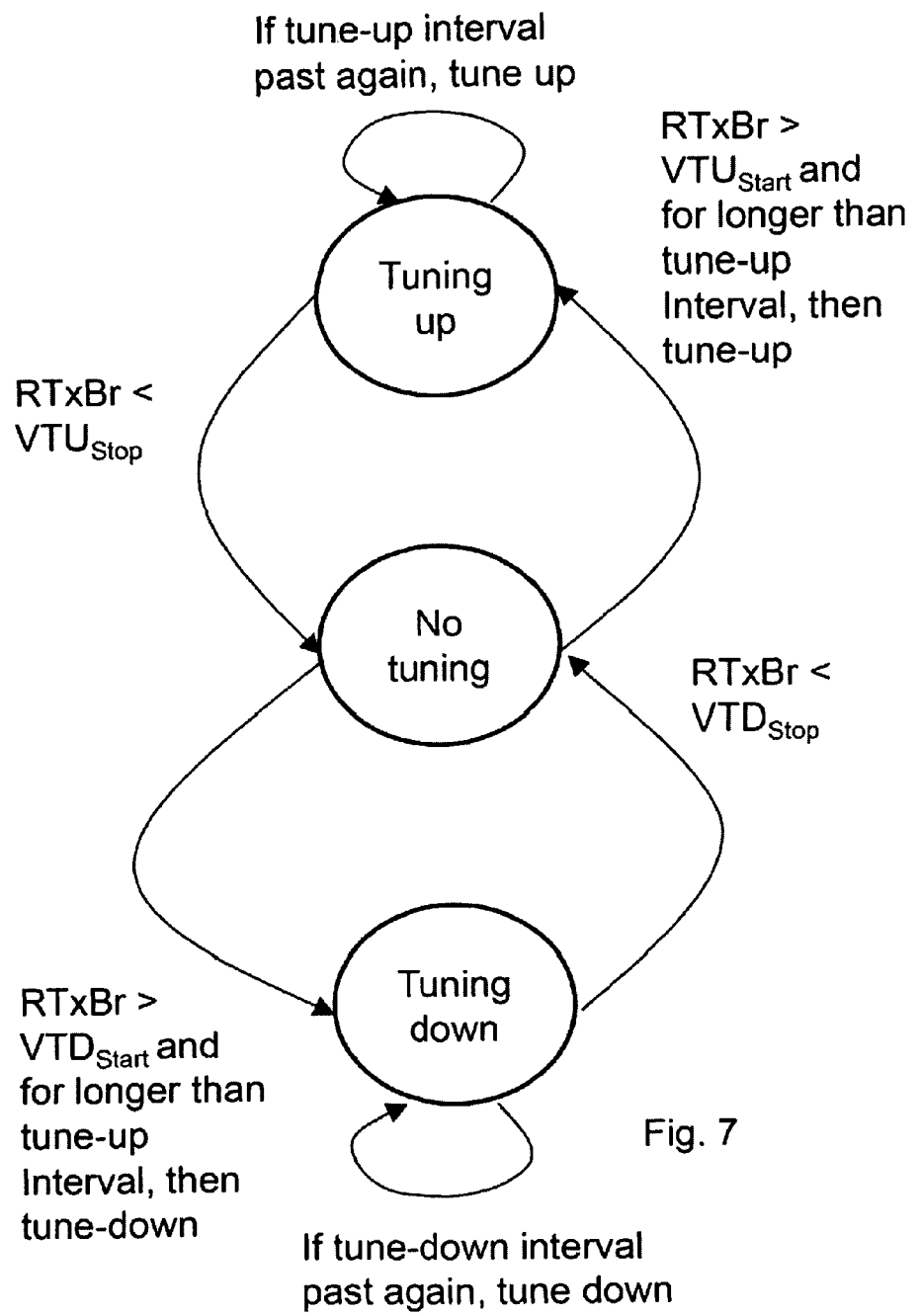
FIG. 7 is a state diagram showing changes in state to cause the transmitter to alter the retransmission bitrate used to correct for lost or corrupted packets.

The functions for performing the adaptive video transmission may be performed by in software using a processor internal to the transmitter, using hardware internal to the processor, or a combination of both. In general, the method includes determining a current video data rate, determining a current generated A/V retry transmission rate, and then determining if any of the state changes need to occur. For example, while the transmitter is initially in the "no tuning state," the need for a video tune-up state change can be determined by calculating if the current generated A/V retry transmission rate is greater than the video tune-up start threshold and if it was triggered more than the video tune-up interval ago. If so, then the state can be set to "tuning up" and the retransmission rate can be increased by the video tune-up step, as shown in FIG. 7. However, if the state is set to "tuning up" and it is determined that the current generated A/V retry transmission rate is greater than the video tune-up stop threshold, then "tuning-up" is no longer required, and the state is set such that "tuning up" is no longer true such that the state returns to the "no tuning" state. Likewise, the need for a video tune-down state change can be determined by calculating if the current generated A/V retry transmission rate is greater than the video tune-down start threshold and if it was triggered more than the video tune-down interval ago. If so, then the state can be set to "tuning down" and the retransmission rate can be increased by the video tune-down step. However, if the state is set to "tuning down" and it is determined that the current generated A/V retry transmission rate is less than the video tune-down stop threshold, then "tuning-down" is no longer required, and the state is set such that "tuning down" is no longer true and the state returns to the "no tuning" state.

While certain configurations of structures have been illustrated for the purposes of presenting the basic structures of the present invention, one of ordinary skill in the art will appreciate that other variations are possible which would still fall within the scope of the appended claims. The systems and techniques described herein can be incorporated into the EMERGE MPX 1500 HD MULTIPOINT EXTENDER manufactured and sold by AVOCENT CORPORATION, the assignee of the present application. Additional information about the EMERGE MPX1500 HD MULTIPOINT EXTENDER can be found in Emerge® MPX1500 HD Multipoint Extender Installer/User Guide (590-906-501A), the contents of which are incorporated herein by reference.

The invention claimed is:

1. A video transmitter for communicating with plural video receivers for connecting to corresponding video display devices, the transmitter comprising:
    rate meter for monitoring a current transmission bitrate and a current maximum retransmission bitrate; and
    determining means for determining if state changes are needed to alter the current maximum retransmission bitrate of the transmitter, wherein the determining means performs the steps of:
        determining if (a) a state of the transmitter is "no tuning" and (b) the current maximum retransmission bitrate has been greater than a video tune-up start threshold for at least a video tune-up interval;
        setting the state of the transmitter to "tuning up" if conditions (a) and (b) are true;
        determining if (c) the state of the transmitter is "tuning up" and (d) the current maximum retransmission bitrate is greater than a video tune-up stop threshold;
        setting the state of the transmitter to "no tuning" if conditions (c) and (d) are true;
        determining if (e) the state of the transmitter is "no tuning" and (f) the current maximum retransmission bitrate has been greater than a video tune-down start threshold for at least a video tune-down interval;
        setting the state of the transmitter to "tuning down" if conditions (e) and (f) are true;
        determining if (g) the state of the transmitter is "tuning down" and (h) the current maximum retransmission bitrate is less than a video tune-down stop threshold;
        setting the state of the transmitter to "no tuning" if conditions (g) and (h) are true;
        increasing the current maximum retransmission bitrate by a video tune-up step when the state of the transmitter is "tuning up" without changing the current transmission bitrate; and
        decreasing the current maximum retransmission bitrate by a video tune-down step when the state of the transmitter is "tuning down" without changing the current transmission bitrate,
    wherein the rate meter prevents retransmission of retransmission data from the video transmitter to the plural video receivers from exceeding the current maximum retransmission rate.

2. The video transmitter as claimed in claim 1, wherein the video transmitter communicates with the plural video receivers using a wireless communications interface.

3. The video transmitter as claimed in claim 2, wherein the wireless communications interface comprises a communications interface complying with an 802.11 family of wireless protocols.

4. A video system comprising:
plural video receivers for connecting to corresponding video display devices; and a transmitter for communicating with the plural video receivers, the transmitter comprising:
a communications interface for communicating with the plural video receivers;
a rate meter for monitoring a current transmission bitrate and a current maximum retransmission bitrate;
determining means for determining if state changes are needed to alter a retransmission bitrate of the transmitter, wherein the determining means performs the steps of:
determining if (a) a state of the transmitter is "no tuning" and (b) the current maximum retransmission bitrate has been greater than a video tune-up start threshold for at least a video tune-up interval;
setting the state of the transmitter to "tuning up" if conditions (a) and (b) are true;
determining if (c) the state of the transmitter is "turning up" and (d) the current maximum retransmission bitrate is greater than a video tune-up stop threshold;
setting the state of the transmitter to "no tuning" if conditions (c) and (d) are true;
determining if (e) the state of the transmitter is "no tuning" and (f) the current maximum retransmission bitrate has been greater than a video tune-down start threshold for at least a video tune-down interval;
setting the state of the transmitter to "tuning down" if conditions (e) and (f) are true;
determining if (g) the state of the transmitter is "tuning down" and (h) the current maximum retransmission bitrate is less than a video tune-down stop threshold;
setting the state of the transmitter to "no tuning" if conditions (g) and (h) are true;
increasing the current maximum retransmission bitrate by a video tune-up step when the state of the transmitter is "tuning up" without changing the current transmission bitrate; and
decreasing the current maximum retransmission bitrate by a video tune-down step when the state of the transmitter is "tuning down" without changing the current transmission bitrate,
wherein the rate meter prevents retransmission of retransmission data from the video transmitter to the plural video receivers from exceeding the current maximum retransmission rate.

5. The video system as claimed in claim 4, wherein communications interface comprises a wireless communications interface.

6. The video system as claimed in claim 5, wherein the wireless communications interface comprises a communications interface complying with an 802.11 family of wireless protocols.

\* \* \* \* \*